Patented Mar. 20, 1945

2,371,915

UNITED STATES PATENT OFFICE 2,371,915

PHENOL-ALDEHYDE RESINS

Clinton Rector, Brooklyn, N. Y., and Conrad F. Schrimpe, Woodbridge, N. J., assignors to Bakelite Corporation, a corporation of New Jersey No Drawing. Application March 20, 1941, Serial No. 384,286

16 Claims. (Cl. 260—30)

This invention relates to phenol-aldehyde resins and comprises resins which have improved properties—such as hardness, surface gloss and plastic flow making them useful in molding compositions, varnishes and cements or bonds—obtained by the incorporation of a hydrous metal oxide or a mixture of such oxides in the synthetic resins.

The hydrous metal oxides are defined (page 1 of H. B. Weiser's book entitled "The Hydrous Oxides" published in 1926 by McGraw-Hill Book Company, Inc., New York city) as follows: "precipitated oxides like ferric oxide which contain varying amounts of water adsorbed by the oxide particles are called hydrous oxides to distinguish them from hydrates in which the water is chemically combined in definite stoichiometric proportions." This definition is adopted herein. Usually hydrous metal oxides are thrown down as highly gelatinous precipitates when an alkali such as sodium hydroxide or ammonia is added to a solution of a salt of a heavy metal. Upon drying, the gelatinous hydrous oxides lose their elasticity and are converted into a powdery mass.

Experience has shown that the mixing of powdered anhydrous oxides with the melted resins results in the formation of lumpy aggregations of the powdered oxides in mechanical admixture with the resin. By grinding the mixture with resin on heated differential rolls these aggregates may be broken down; but they remain definitely visible, and only a slight portion of the oxide becomes finely dispersed in the resin.

The present invention is based on the discovery that hydrous metal oxides, preferably freshly prepared, can be dispersed in phenolaldehyde resins, to yield a resin containing only a negligible amount of metallic oxide of visible particle size, by adding the hydrous metal oxide in a gelatinous state to a wet resin, such as is obtained after the refluxing reaction between a phenol and an aldehyde, and then dehydrating the mixture with continuous stirring. By this procedure the hydrous metal oxide becomes so finely dispersed as to be largely colloidal and forms a part of the resin; under other procedures, such as the incorporation of the anhydrous metal oxide, it exists as a relatively coarse mechanical filler. The fineness of division obtained by the dispersion of the hydrous metal oxides greatly increases the surface area; and it is believed that it is the surface activity of the hydrous oxides in this form which contributes the improvements of hardness, gloss, denseness, etc., which follow.

As an illustration, the process is more completely set out in the following example as applied to fusible non-reactive phenolic condensation resins but capable of being converted to an infusible and substantially insoluble condition by the addition of a hardener.

A still, fitted with a reflux condenser and an agitator, is charged with 100 parts by weight of phenol, 70 parts by weight of 40% aqueous formaldehyde, and 0.5 part by weight of phosphoric acid. The mixture is heated to boiling whereupon an exothermic resin reaction begins. After the initial fogging of the reaction material, which indicates separation of resin within the mass, additional heat is then supplied to maintain a gentle boil for four or five hours. Then 95 parts by weight of a gelatinous hydrous chrome oxide containing about 25% solids (solids determined by heating three hours at 135° C. under atmospheric pressure) are added and stirred into the resin. After mixing the mass is dehydrated at atmospheric pressure with continuous stirring, and the product obtained is hard and brittle at room temperature and possesses a softening point about 99° C.; it has the uniform appearance and other characteristics of a resin rather than a mixture.

The so-modified fusible resin mass is convertible upon the application of heat to an infusible and mechanically strong product by adding an active methylene body such as hexamethylenetetramine, paraformaldehyde or trioxymethylene; since the resin mass is easily grindable to a fine non-sintering powder, a pulverized dry hardener such as hexamethylenetetramine can be mixed with the pulverized fusible resin; the usual ratio is about 10 parts by weight of resin to 1 part by weight of hardener. A thin layer of this mixture hardens within 50 seconds on a hot plate having a constant temperature of 160° C. This same test shows the pronounced effect of the hydrous metal oxide in that the modified resin sets up to a hard enamel-like film, whereas a similar resin without the hydrous metal oxide bubbles and froths on the hot plate and finally hardens to a rough porous mass; an explanation for this fundamental difference in action may be that the hydrous metal oxide particles, being in colloidal form in the resin, are active adsorbents of volatiles, such as water vapor and uncombined ammonia, evolved during the heat-hardening of the resin.

In the manufacture of the initial fusible phenolic condensation product acid catalysts other than phosphoric acid can be employed. Catalytic proportions of hydrochloric acid, sulphuric acid, oxalic acid and also acid reacting salts, i. e., iron chloride, zinc chloride, aluminum chloride, sodium acid sulfate, etc., have been found to be suitable. The ratio of phenol and formaldehyde can vary somewhat, although it is desirable that less than a mol of formaldehyde should be used per mol of phenol to yield a substantially fusible type resin.

As to the amount of gelatinous hydrous oxide which can be incorporated in a fusible phenolic condensation resin, experiments have shown that from five to twenty-five, and preferably about ten per cent, is a desirable quantity to give dense molded compositions and strong bonds from the cured resin. Increasing the amount of gelatinous hydrous oxide to thirty per cent of a resin made as above described produces a composition having a softening point of 146° C., and with the addition of ten per cent of a hardener such as hexamethylenetetramine it hardens in less than 5 seconds on a hot plate maintained at 160° C.; this rapid hardening is not desirable in all molding compositions, but there are special applications in commercial molding where rapid hardening is demanded, such as in the molding of small objects like bottle caps. The accelerated hardening effect of a hydrous metal oxide is noticeable in concentrations as low as one per cent of the resin mass. In the range between one and thirty per cent hydrous metal oxide content of a resin, variations in plastic flow and hardening are obtainable to satisfy practically all requirements ranging between easy flowable resinous molding compositions to those barely having enough flow to form a consolidated sheet.

The gelatinous oxides of the following metals have been found most economical for incorporation in phenolic resins: aluminum, cerium, thorium, titanium, tungsten, lead, bismuth, cadmium, copper, antimony, nickel, zirconium, iron, chromium, arsenic, manganese, silicon, tin and vanadium. The hydrous oxide of any heavy metal can be incorporated in a fusible phenolic resin, although the rare earth metals such as praseodymium, neodymium, etc., and the noble metals, platinum, iridium, etc., are too expensive for normal use in resins. Likewise mixtures of the hydrous oxides of different metals can be incorporated in phenolic resins with the same desirable improvements obtainable by the incorporation of a single hydrous metal oxide.

Molding compositions are prepared in the usual manner of the art by mixing on heated rolls the modified fusible resin with fillers such as wood flour, asbestos or cotton flock, etc. and coloring bodies either pigments and/or dyes and a hardener such as hexamethylenetetramine; articles molded therefrom have excellent surface gloss and freedom from blisters frequently present in molded articles and usually caused by entrapped vapors. The same resin with a hardener dissolved in ethyl alcohol yields a varnish suitable for the impregnation or coating of paper or textiles which can be subsequently dried, cut into suitable sizes, stacked into a heated molding press between polished platens and cured to dense laminated structures having smooth lustrous surfaces. The resin is also suitable as a bonding or cementing agent in grinding wheels and other structures because it produces a uniformly strong bond.

Although the incorporation of metal hydrous oxide into a fusible form of phenol-formaldehyde resin offers no special difficulties, more care is required when a hydrous oxide is incorporated in a phenolic condensation product of the heat-reactive type, because dehydration of the resin must be carried out rapidly to prevent the resin from forming an insoluble and infusible body at this stage of manufacture. Thus a typical heat-reactive type of phenol condensation resin can be made by boiling for 80 minutes in a still 100 parts by weight of phenol, 86 parts by weight of 37½% formaldehyde and 3½ parts by weight of 28% ammonia or other base. Then 95 parts by weight of a hydrous chrome oxide in a gelatinous state containing 25% solids (determined by heating 3 hours at 135° C. under atmospheric pressure) are stirred into the resin; dehydration of the reaction product is then conducted rapidly under the highest vacuum obtainable without causing excessive frothing until a brittle resin is obtained which can be finely ground and is non-sintering. This product can be mixed on heated rolls with the usual fillers such as wood flour, cotton flock and asbestos, and gives a rapid curing molding mixture. The same product dissolved in alcohol, produces a heat-reactive varnish suitable for the impregnation of paper or fiber sheets in the manufacturing of laminated structures.

As with the fusible phenolic condensation resins, uniform and substantially colloidal dispersions of the hydrous oxides of the heavy metals occur in the heat-reactive phenolic condensation resins with the same resultant improvements of gloss, cure, hardness, uniform strength, etc. in molded articles, laminated products and cements or bonds made with these hydrous oxide containing resins. The amount of hydrous metal oxide which can be desirably incorporated in the heat-reactive phenolic condensation resin lies within the range of between one and thirty per cent of the resin, but generally about ten per cent has been found preferable because the flow properties are those found most desirable in the average molding composition. Amounts over thirty per cent of hydrous metal oxide result in heavy pasty masses of resin which are extremely difficult to dehydrate.

What is claimed is:

1. The process of producing a resinous composition which comprises adding precipitated gelatinous hydrous metal oxide particles containing adsorbed water to a wet phenol-aldehyde resin, and then dehydrating to obtain the resinous composition.

2. The process of producing a molding composition which comprises adding precipitated gelatinous hydrous metal oxide particles containing adsorbed water to a wet fusible phenol-aldehyde resin, dehydrating to obtain a resinous composition, and incorporating therewith a filler and a methylene-containing hardening agent to yield a heat-hardening composition.

3. The process of producing a composition which comprises adding precipitated gelatinous hydrous metal oxide particles containing adsorbed water to a wet fusible phenol-aldehyde resin, dehydrating to obtain a resinous composition, and incorporating therewith a methylene-containing hardening agent to yield a heat-hardening composition.

4. The process of producing a molding composition which comprises adding precipitated gelatinous hydrous metal oxide particles containing adsorbed water to a wet heat-reactive phenol-aldehyde resin, then dehydrating to obtain a resinous composition, and incorporating therewith a fibrous filler to yield a heat-hardening composition.

5. The process of producing a composition which comprises adding precipitated gelatinous hydrous metal oxide particles containing adsorbed water to a wet heat-reactive phenol-aldehyde resin, and then dehydrating to obtain a resinous composition.

6. Process of preparing a heat-hardenable composition which comprises adding precipitated gelatinous hydrous metal oxide particles containing adsorbed water to a wet fusible phenol-aldehyde resin, dehydrating the mixture, treating the product with an organic solvent for the resin to dissolve the resin and suspend the particles, and incorporating a methylene-hardening agent for the resin.

7. The process of producing a resinous composition which comprises adding precipitated gelatinous hydrous metal oxide particles containing adsorbed water to an undehydrated phenol-aldehyde resin, and then dehydrating to obtain a grindable, non-sintering resinous composition.

8. The process of producing a resinous composition which comprises adding a mixture of precipitated gelatinous hydrous metal oxides containing water adsorbed by the component oxide particles to an undehydrated phenol-aldehyde resin, and then dehydrating the resinous composition.

9. A resinous composition comprising a phenol-aldehyde resin having dispersed therein from about one to thirty per cent of precipitated hydrous metal oxide particles in substantially colloidal form.

10. A resinous composition comprising a dehydrated phenol-aldehyde resin having dispersed therein from about one to thirty per cent of a mixture of precipitated particles of hydrous metal oxides in substantially colloidal form.

11. A molding composition comprising a fibrous filler and a heat-reactive phenol-aldehyde resinous binder having from about one to thirty per cent of precipitated hydrous metal oxide particles in substantially colloidal form.

12. A molding composition comprising a fibrous filler, a methylene-containing hardener and a fusible phenol-aldehyde resin binder having from about one to thirty per cent of precipitated hydrous metal oxide particles in substantially colloidal form.

13. Varnish comprising in solution in an organic solvent a phenol-aldehyde resin in heat-reactive condition, and precipitated hydrous metal oxide particles dispersed in the solution, said particles being present in substantially colloidal form and in amount ranging from one to thirty per cent of the weight of the resin.

14. Varnish comprising in solution in an organic solvent a fusible phenol-aldehyde resin, precipitated hydrous metal oxide particles in substantially colloidal form dispersed in the solution, and a methylene-containing hardening agent for the resin.

15. The process of producing a heat-hardenable varnish which comprises adding precipitated gelatinous hydrous metal oxide particles containing adsorbed water to an undehydrated phenol-aldehyde resin in heat-reactive condition, dehydrating the mixture to obtain a resinous composition wherein the hydrous metal oxide particles are dispersed in substantially colloidal form, and treating the resinous composition with an organic solvent to dissolve the resinous portion of the composition and to suspend the oxide particles in the resin solution.

16. A molding composition comprising a fibrous filler and a phenol-aldehyde resinous binder having dispersed therein a mixture of precipitated particles of hydrous metal oxides in substantially colloidal form.

CLINTON RECTOR.
CONRAD F. SCHRIMPE.